United States Patent [19]

Itoh

[11] Patent Number: 5,369,240
[45] Date of Patent: Nov. 29, 1994

[54] GRAPHITE MATRIX ELECTRODE WITH DISPERSED SILICON PARTICLES

[75] Inventor: Tetsuro Itoh, Rolling Meadows, Ill.

[73] Assignee: Mitsubishi Denki Kabushiki Kaisha, Tokyo, Japan

[21] Appl. No.: 831,543

[22] Filed: Feb. 5, 1992

[51] Int. Cl.⁵ ............................................. B23H 1/06
[52] U.S. Cl. .................................................. 219/69.15
[58] Field of Search ....................... 219/69.15; 252/502, 252/503, 506

[56] References Cited

U.S. PATENT DOCUMENTS

| | | | |
|---|---|---|---|
| 4,373,127 | 2/1983 | Haskett et al. | 219/69.15 |
| 4,459,453 | 7/1984 | Inoue | 219/69.15 |
| 4,799,957 | 1/1989 | Vogel | 252/502 |
| 4,952,768 | 8/1990 | Mohri et al. | 219/69.15 |

FOREIGN PATENT DOCUMENTS

| | | |
|---|---|---|
| 58-114820 | 7/1983 | Japan . |
| 1-5731 | 1/1989 | Japan . |
| 3-184724 | 8/1991 | Japan ............ 219/69.15 |
| 787731 | 12/1957 | United Kingdom . |

Primary Examiner—Geoffrey S. Evans
Attorney, Agent, or Firm—Sughrue, Mion, Zinn, Macpeak & Seas

[57] ABSTRACT

An electrode for an electric discharge machining apparatus of the type in which a workpiece is machined by generating an electric discharge across a machining gap between a confronting electrode and the workpiece through a machining solution includes a matrix of a first conductive material and a plurality of crystalline semi-crystalline or amorphous particles of a second conductive material for promoting a plurality of discharge sites for the electric discharge, the particles being uniformly dispersed throughout void spaces of the matrix. The particle sizes and weight ratio of the first and second conductive materials are established so as to provide an optimal discharge site density in the exposed surfaces of the electrode.

6 Claims, 3 Drawing Sheets

GRAPHITE MATRIX ELECTRODE WITH DISPERSED SILICON PARTICLES

FIELD OF THE INVENTION

The present invention relates generally to an electric discharge machining (EDM) apparatus. More specifically, the present invention relates to an improved electrode for an EDM apparatus. The present invention is particularly advantageous in that the electrode of the EDM apparatus provides a myriad of discharge sites whereby formation of localized EDM craters due to localized machining current concentrations are prevented.

BACKGROUND OF THE INVENTION

A typical EDM apparatus 1 of the type described above is illustrated in FIG. 1 and includes an electrode 10 supported by a shaft 12 and suspended over a tank 14. Shaft 12 is connected at its opposite end to a piston 16, which is positioned by hydraulic fluid provided by a motor 20 via an electrically controlled servo valve 18. Electrode 10 opposes a workpiece 22 across a machining gap G. Tank 14 is filled with a machining solution 24, whose level in the tank insures that machining gap G is always filled with machining solution 24.

Electrode 10 and workpiece 22 are serially connected by a pair of leads to output terminals of machining power source 30, which includes a DC power supply 32 with a rated output of E volts (V), a switch 34 for switching the power source 30 ON and OFF, an oscillator 36 for controlling the operation of switch 34 and a current limiting resistor 38 with a resistance value of R. Power source 30 supplies an interelectrode voltage $V_G$ to the pair of leads so that a switching current (machining current) I is generated between electrode 10 and workpiece 22.

The current I is represented by the expression $I = (E - V_G)/R$, where $V_G$ is in the range of about 20 to 30 V during an arc discharge period, 0 V during a short circuiting period and E V during periods when no arc discharge occurs. If the interelectrode voltage $V_G$ is detected and averaged by a smoothing circuit 40, the machining gap G can be controlled in response to the averaged value of the interelectrode voltage $V_G$. More specifically, when the machining gap G is wide, discharge across the machining gap does not occur and the average voltage, hereinafter denoted $V_{ave}$, becomes high, i.e., approaches E. When the gap is narrow, a short circuit between the electrode 10 and workpiece 22 can occur, which results in a reduction in the average voltage $V_{ave}$. Accordingly, when the value of $V_{ave}$ is compared with a reference voltage $V_{REF}$, the magnitude and polarity of the difference between these two voltages can be applied to servo valve 18 via an amplifier 42 to properly position electrode 10 with respect to workpiece 22. Thus, the difference between $V_{ave}$ and $V_{REF}$, e.g., control voltage $V_C$, can be used to control the machining gap G at a substantially constant value.

Electrodes formed from either graphite or metallic materials are used in conventional EDM apparatus 1. Metallic materials such as copper, while low in cost, have low melting points and are thus subject to rapid electrode erosion. Graphite is the electrode material of choice for many applications due to its relatively low cost with respect to more exotic metallic materials such as tungsten. Graphite is also superior in workability to tungsten electrodes, thus allowing complex electrodes to be machined at a relatively low cost.

Experiments using silicon as the electrode material have been conducted. In particular, silicon electrodes having a relatively high resistance have been used to produce workpiece surface finishes with a relatively constant roughness per square irrespective of the surface area of the electrode. As shown in FIG. 2, workpiece surface roughness when using a copper electrode increases proportionately to the surface area of the electrode. One explanation of this observed effect is that the Si electrodes provide a plurality of discharge sites at the surface of the electrode. When a plurality of equipotential discharge points are available, identical electric field gradients are applied at each discharge site and localized discharge occurs at each point. In other words, the surface charge is distributed over a large number of discharge sites with respect to the surface area of the Si electrode.

While Si electrodes provide superior surface finishes, it is difficult to produce usable Si electrodes in three dimensional shapes. Experiments have been conducted using Si powder dispersed in the machining solution in an attempt to achieve similar surface finishing results using conventional electrodes. The experimental results indicate an improvement over conventional electrodes, as indicated in FIG. 2. It will be noted, however, that it is difficult to maintain a uniform Si particle distribution in the machining gap G, particularly in the low flow laminar layers on either side of this gap. Practical devices employing machining solutions containing Si powder require additional or more complex components for maintaining the Si powder in suspension at a proper concentration and for increasing the machining solution 24 flow rates through the machining gap G to keep the Si powder from accumulating in low flow regions of the machining gap G.

SUMMARY OF THE INVENTION

The principal purpose of the present invention is to provide an improved electrode material having the advantages associated with silicon electrodes while eliminating the disadvantages noted in the discussion immediately above.

Another object of the present invention is to provide an improved electrode having an optimal discharge site per square distribution.

Yet another object of the present invention is to provide an improved electrode for an EDM apparatus having high erosion resistance.

Still another object of the present invention is to provide an improved EDM apparatus which can be produced at low cost.

These and other objects, features and advantages of the invention are provided by an electrode for an electric discharge machining apparatus of the type in which a workpiece is machined by generating an electric discharge across a machining gap between a confronting electrode and the workpiece through a machining solution while feeding the electrode towards the workpiece. The electrode includes a matrix of a first conductive material and a multitude of crystalline, semicrystalline or amorphous particles of a second conductive material for promoting a plurality of discharge sites for the electric discharge, each of the particles being disposed in a void space of the matrix.

According to one aspect of the present invention, the first conductive material is graphite while the second conductive material is silicon. The graphite advantageously includes graphite particles of a first predetermined size and the silicon includes silicon particles of a second predetermined size. In an exemplary case, the particle size ratio of the first predetermined size to the second predetermined size is in a range of about 1.0 to 0.2. In another exemplary case, the particle size ratio is in a range of about 1.0 to 0.1.

According to another aspect of the present invention, the thermal conductivity of the first conductive material is greater than the thermal conductivity of the second conductive material. It will be appreciated that the higher thermal conductivity of the first conductive material allows thermal shielding of the second conductive material.

According to yet another aspect of the present invention, the matrix comprises a first weight of the first conductive material and the crystalline particles comprise a second weight of the second conductive material. The weight ratio of the first weight to the second weight is substantially equal to a predetermined value selected so as to permit the electrode to provide an optimal discharge site density.

These and other objects, features and advantages of the present invention are provided by an improved electric discharge machining apparatus of the type in which a workpiece is machined by generating an electric discharge across a machining gap between a confronting electrode and the workpiece through a machining solution while feeding the electrode towards the workpiece, the improvement characterized in that the electrode includes a plurality of crystalline particles of a conductive second material disposed in a matrix of a conductive first material so as to permit the crystalline particles to provide a plurality of discharge sites defining a plurality of paths for the electric discharge.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted by like or similar numbers, and in which.

DESCRIPTION OF THE PREFERRED EMBODIMENTS

Figure 1:
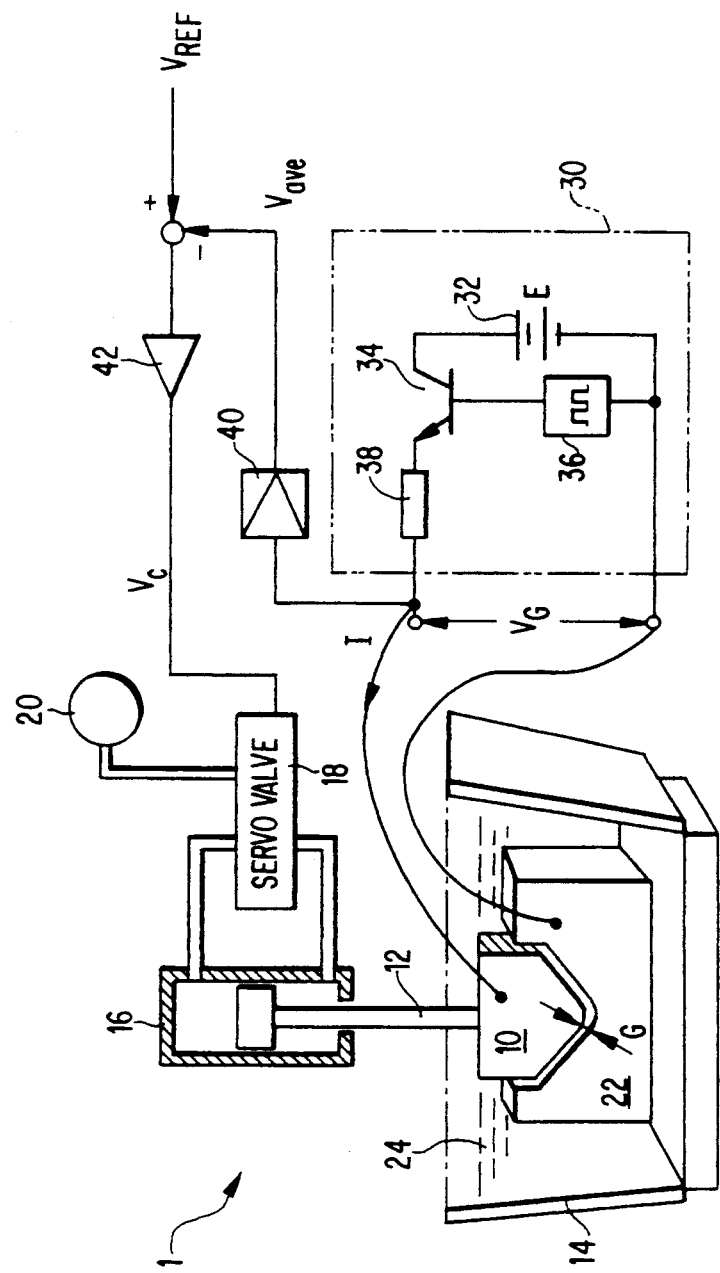
FIG. 1 is an illustrative diagram of a typical EDM apparatus for explaining the background in which the present invention was made.
Figure 2:
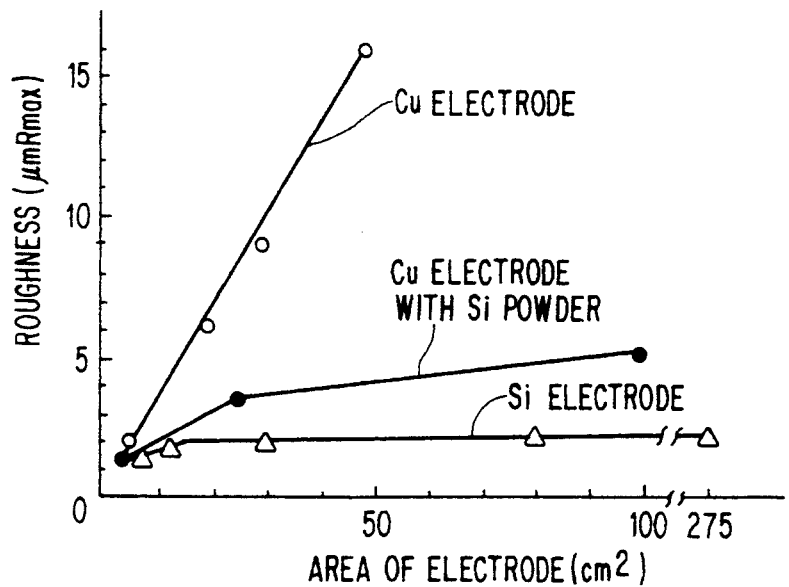
FIG. 2 is a family of curves relating electrode surface area to surface roughness for various electrode materials.
Figure 3A:
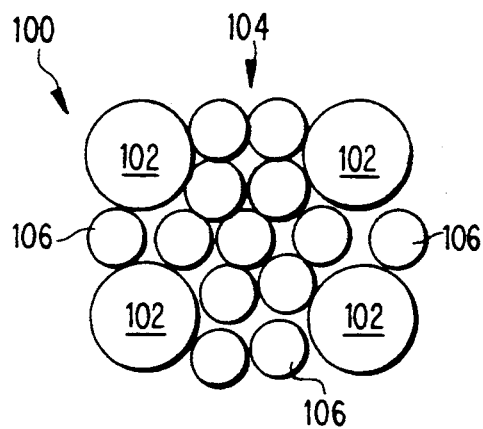
FIG. 3A and 3B are illustrative diagrams of top and side views, respectively, of a section of an electrode surface according to the present invention.

A preferred embodiment of the present invention will now be described while referring to FIGS. 3A and 3B, wherein a typical section 100 of an electrode 10', discussed in greater detail below, includes a plurality of first particles 102 dispersed in a matrix 104, which matrix advantageously surrounds and binds first particles 102 into a rigid structure. Preferably, matrix 104 comprises a plurality of second particles 106 interlinked with one another. Both the first and second particles are conductive or semi-conductive materials, i.e., materials capable of transporting an electric charge.

Figure 3B:
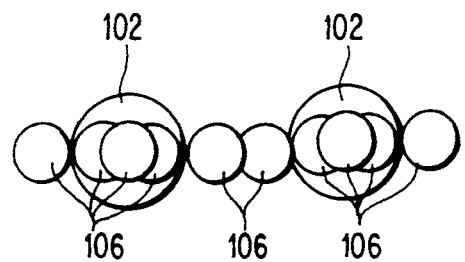

As shown in FIG. 3B, the relative sizes of the first and second particles are different from one another, although the particle sizes advantageously could be equal to one another. In an exemplary case, however, first particles 102 are larger than second particles 104 by a predetermined factor or ratio. Preferably, the size ratio of first particles to second particles is in the range of about 1.0 to 10.0 and, most preferably, the size ratio is on the order of about 1.0 to 5.0. Thus, first particles 102 are surrounded by closely linked smaller second particles 106 forming matrix 104. It should be noted that the overall structural strength of electrode 10' is due to bonding of particles 106 with one another while less significant structural strength is provided by interparticle bonding between first particles 102 and second particles 106.

Preferably, first particles 102 comprise an amorphous or crystalline semi-conductive material and, most preferably, first particles 102 comprise silicon. According to the present invention, second particles 106 comprise graphite.

The size of first and second particles 102, 106 advantageously can be controlled by material selection prior to mixing these particles during the fabrication process while the weight ratio of first particles to second particles advantageously can be controlled during the mixing step. It will be noted that graphite particles are commercially available in a variety of particle sizes. The weight ratio between, e.g., graphite and silicon is advantageously equal to a predetermined value corresponding to the optimal discharge site density, which can be determined by experimentation using the intended workpiece material and based on the desired surface roughness of the completed workpiece. The discharge site density depends on the amount of silicon contained in the electrode, as silicon has the effect of dispersing the electrical discharge. For example, when the desired surface roughness is relatively high, the optimal discharge site density is relatively low so that less charge dispersion in electrode 10' needs to occur during machining operations, and therefore less silicon is necessary in the mix. Lower values of surface roughness would require a relatively high discharge site density, and thus more silicon, in the material comprising electrode 10'.

It will be appreciated that an electrode 10' comprising a matrix of particulate graphite particles 106 surrounding crystalline silicon particles 102 provides a lower erosion rate than conventional metallic electrodes. Erosion rate is primarily a thermal effect based on the thermal conductivity of the electrode and workpiece materials and their relative melting points. When the melting point of the workpiece is exceeded and machining starts before the melting point of the electrode is reached, electrode erosion will be satisfactorily low. Copper, for example, has a lower melting point than steel but has a correspondingly greater thermal conductivity. Thus, the melting point of the steel workpiece is exceeded before the melting point of the copper electrode because of the heat dissipation of the copper.

Preferably, the thermal conductivity of the second material is greater than the corresponding thermal conductivity of the first material. This advantageously is the case for silicon and graphite composite electrodes according to the present invention, where the thermal conductivity of graphite is higher than the thermal conductivity of silicon. Thus, the heat induced in the silicon first particles 102 is dissipated in matrix 104 by graphite second particles 106 so that the melting point of the workpiece is exceeded before the melting point at the discharge sites provided by silicon first particles 102 is reached. It will be appreciated that the electrode according to the preferred embodiment of the invention advantageously has a low intrinsic erosion rate for most workpiece materials.

As discussed above, graphite electrodes are commonly used in many EDM applications. In particular, graphite electrodes formed from graphite particles having an average size of several microns or less are often employed due to the increased strength of such electrodes with respect to electrodes formed from larger particles. It should be noted that the decrease in particulate size promotes uniformity in the flat surfaces of such electrodes, which, in turn, increases the electric charge concentration at electrode defect points and protrusions intentionally included in the surface detailing of the electrode. The localized increase in the surface charge adversely increases the discharge cratering in the workpiece. Conversely, the promotion of a high number of localized discharge sites in electrode 10' advantageously minimizes the size of discharge craters produced during the machining operation. In other words, the electrode 10' according to a preferred embodiment of the present invention promotes a plurality of discharge paths between the surfaces of electrode 10' and the workpiece, thereby assisting in normalizing the current density over the entire surface area of electrode 10'.

Figure 4:
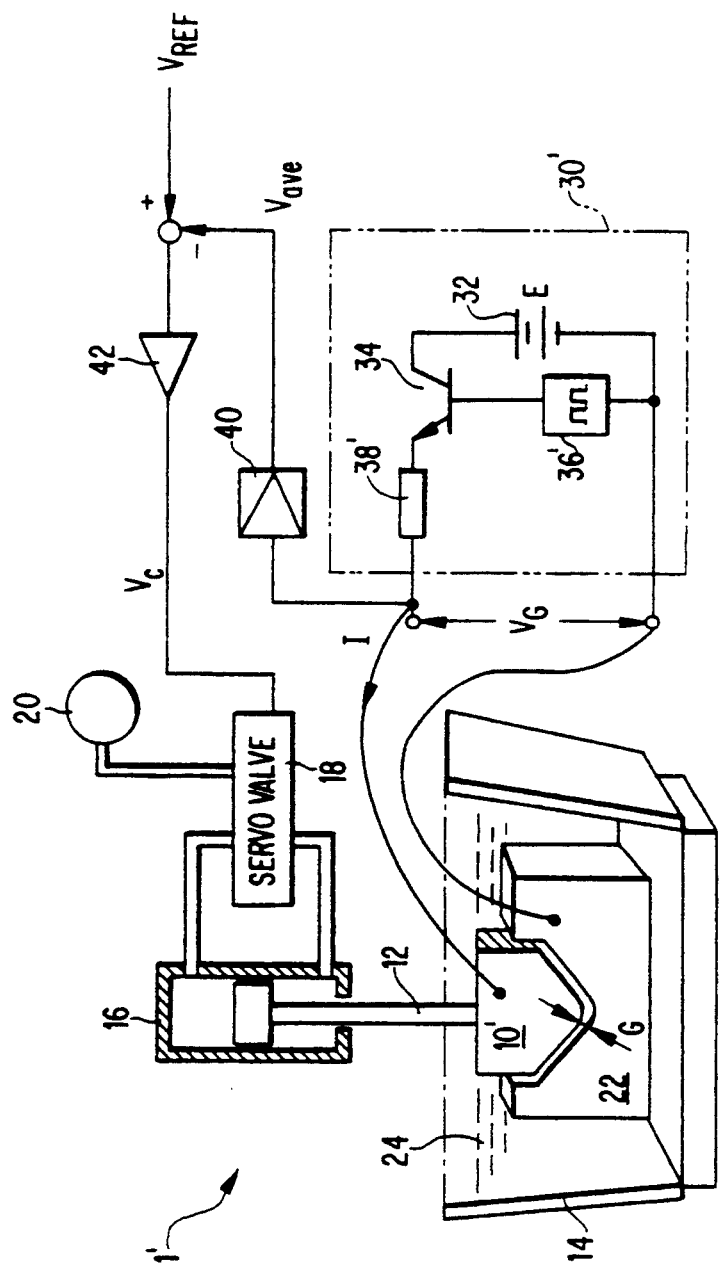
FIG. 4 is an illustrative diagram of an EDM apparatus incorporating the electrode of FIG. 3.

With the above discussion in mind, an improved EDM apparatus 1' will now be described while referring to FIG. 4. Since many of the features of EDM apparatus 1 and EDM apparatus 1' are similar, only the specific variations between the two devices will be discussed in the interest of brevity.

EDM apparatus 1' includes a composite electrode 10' formed from first and second particles 102, 106. Electrode 10' is advantageously connected to power source 30', which includes an oscillator 36' and a current limiting resistor 38'. Preferably, resistor 38' is a conventional resistor which is sized to account for the increased resistance of electrode 10' with respect to a conventional metallic electrode 10. Oscillator 36' advantageously can be a variable waveform or slope-controlled oscillator. Oscillator 36' advantageously provides a signal which gradually turns on switch 34 in power source 30', thus gradually increasing the voltage $V_G$ applied across machining gap G between electrode 10' and workpiece 22. It should be noted that the gradual application of power advantageously allows for additional time for heat produced at the statistically prevalent discharge sites, i.e., particles 102, to be dissipated to matrix 104. It will be apparent that control of voltage $V_G$ in this manner advantageously reduces the erosion rate of electrode 10' even further.

It will also be appreciated that the improved EDM apparatus 1' can be produced at a very low increase in cost over that of conventional EDM apparatus 1, since minimal changes to the conventional device are needed to accommodate the improved electrode 10'.

Although the present invention has been discussed with respect to electrode formation using silicon and graphite material, it should be noted that this description is exemplary in nature. Other first and second conductive materials advantageously can be substituted for silicon and graphite to provide and control high discharge site densities in a high thermal conductivity matrix material. Thus, electrodes formed from other materials are within the scope of the present invention.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An electric discharge machining apparatus for machining a workpiece including an electrode facing the workpiece across a machining gap between said electrode and the workpiece wherein said electrode machines the workpiece by the development of an electric charge across said machining gap toward the workpiece said electrode comprising:

means for introducing free silicon particles into said machining gap by releasing said free silicon particles out of surface regions of said electrode, to provide a plurality of discharge paths for said electric charge developed at said electrode, and wherein said means for introducing said free silicon particles into said machining gap comprises an electrode structure in the form of first particles of silicon dispersed in a continuous matrix of second particles of a low-wear material.

2. The electric discharge machining apparatus of claim 1, wherein said low-wear material is graphite.

3. The electric discharge machining apparatus of claim 2, wherein said silicon particles are of a first predetermined size and said graphite comprises graphite particles of a second predetermined size and wherein a particle size ratio of said first predetermined size to said second predetermined size is in a range of about 1.0 to 5.0.

4. The electric discharge machining apparatus of claim 2, wherein said silicon particles are of a first predetermined size and said graphite comprises graphite particles of a second predetermined size and wherein a particle size ratio of said first predetermined size to said second predetermined size is in a range of about 1.0 to 10.00.

5. The electric discharge machining apparatus of claim 1, wherein the thermal conductivity of said low-wear material is greater than the thermal conductivity of said first particles of silicon.

6. The electric discharge machining apparatus of claim 1, wherein said continuous, uniform matrix comprises a first weight of said first particles of silicon and a second weight of said second particles of said low-wear material, and wherein a weight ratio of said first weight to said second weight is substantially equal to a predetermined value selected so as to permit said electrode to provide an optimal discharge site density.

* * * * *